US006445680B1

(12) United States Patent
Moyal

(10) Patent No.: US 6,445,680 B1
(45) Date of Patent: Sep. 3, 2002

(54) LINKED LIST BASED LEAST RECENTLY USED ARBITER

(75) Inventor: Yehuda Moyal, Holon (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/085,341

(22) Filed: May 27, 1998

(51) Int. Cl.⁷ .............................. H04L 12/28; H04J 1/16
(52) U.S. Cl. ...................................... 370/236; 370/416
(58) Field of Search .............................. 370/230–235, 370/394, 395, 412–413, 414, 416, 428, 429, 236, 230.1, 395.1

(56) References Cited

U.S. PATENT DOCUMENTS

| 5,475,680 A | * 12/1995 | Turner ........................ 370/412 |
| 5,521,916 A | * 5/1996 | Choudhury et al. ......... 370/412 |
| 5,689,500 A | * 11/1997 | Chiussi et al. .............. 370/235 |
| 5,838,915 A | * 11/1998 | Klausmeier et al. ........ 370/412 |
| 5,864,540 A | * 1/1999 | Bonomi et al. ............. 370/235 |
| 5,872,769 A | * 2/1999 | Caldara et al. ............. 370/230 |
| 5,893,162 A | * 4/1999 | Lau et al. ................... 711/153 |

OTHER PUBLICATIONS

Kwok, T., "ATM: The New Paradigm For Internet, Intranet & Residential Broadband Services & Applications", Prentice Hall, pp. 214–215 and 256–258 (1998).

* cited by examiner

Primary Examiner—Chau Nguyen
Assistant Examiner—Andrew A. Lee
(74) Attorney, Agent, or Firm—Howard Zaretsky

(57) ABSTRACT

An arbiter utilizing a link list to arbitrate access between multiple data sources and a single destination. The arbiter is of the least recently used type whereby the data source that has not sent data for the longest time is given the highest priority. The arbiter provides an arbitration function in a simple manner and at high speeds. The arbiter utilizes a Non Empty Source Queue (NESQ) list that comprises only sources that are non empty, i.e., that have data ready to send. If a source queue chosen for data transmission still has data to send, it is placed at the end of the NESQ list. When a source queue becomes empty after the transmission of data, the source index is removed from the linked list. Conversely, when a source queue that was previously empty receives a new packet it is added to the end of the linked list.

10 Claims, 7 Drawing Sheets

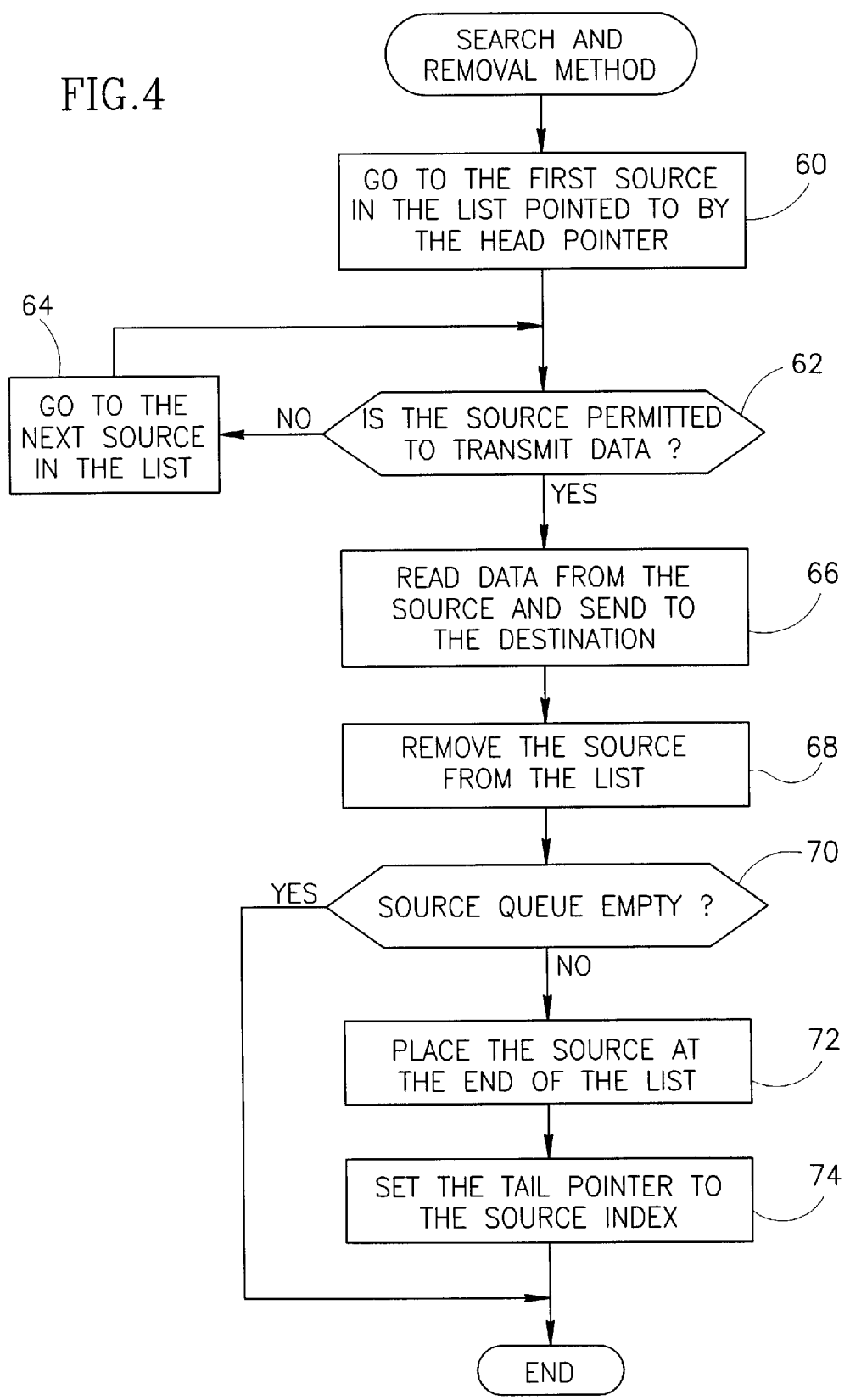

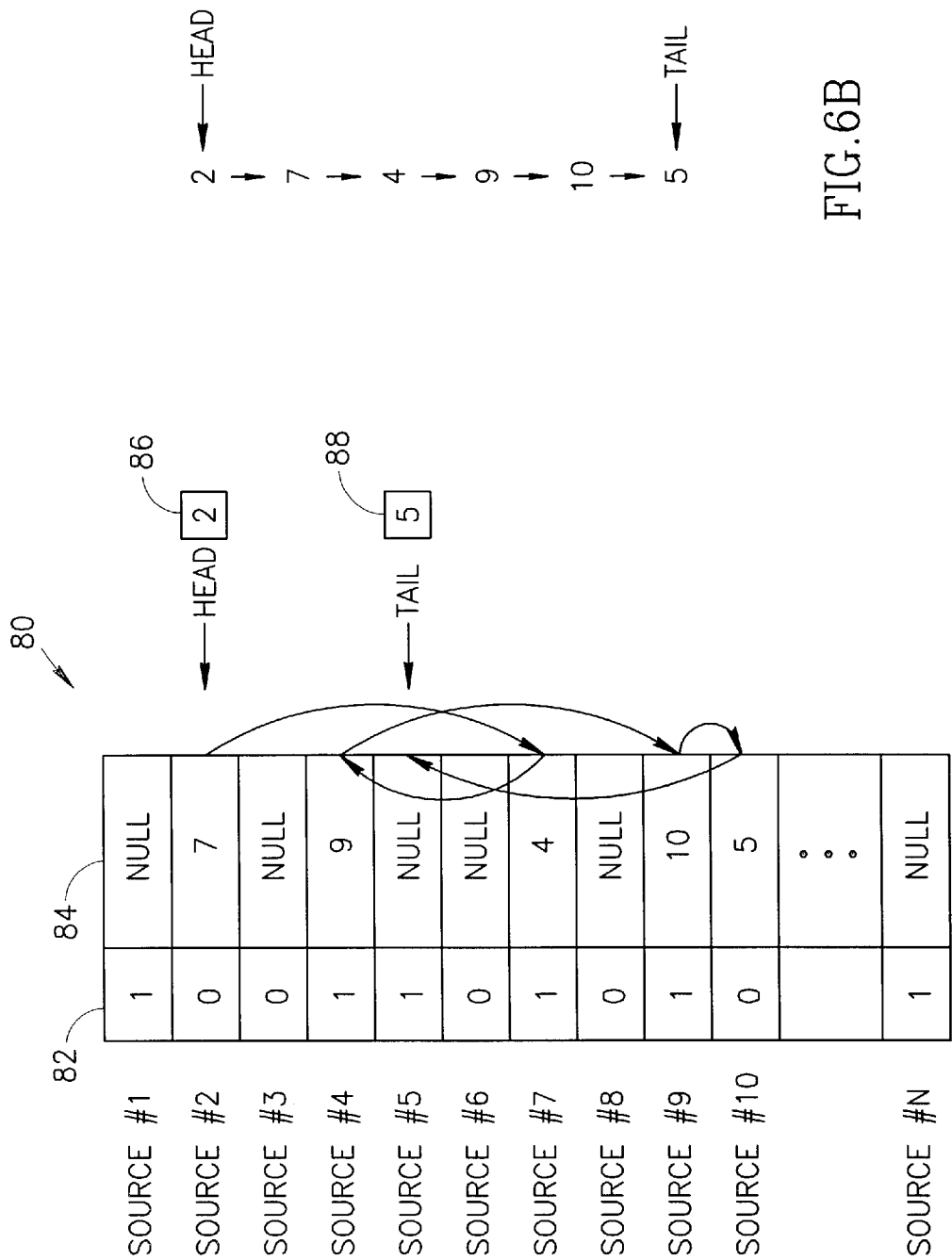

LINKED LIST BASED LEAST RECENTLY USED ARBITER

FIELD OF THE INVENTION

The present invention relates generally to data communication networks and more particularly relates to a least recently used (LRU) arbiter based on a linked list mechanism.

BACKGROUND OF THE INVENTION

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

Asynchronous Transfer Mode

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

More information on ATM networks can be found in the book "ATM: The New Paradigm for Internet, Intranet and Residential Broadband Services and Applications," Timothy Kwok, Prentice Hall, 1998.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

Prior Art Source Queue Arbitration

The environment of the present invention is a data communications network. In a data communications network, data is transferred from end to end, i.e., from source to destination, in data units. Different types of networks give their data units different names. For example, the data units in Ethernet networks are called frames, in ATM networks the data units are called cells and in TCP/IP networks the data units are called packets. A packet (or frame, cell, etc.) is defined as a part of a message that the higher level software application desires to send from a source to a destination or several destinations. In addition, messages can be sent from multiple sources to the same destination.

Each network equipment device has means by which several sources of input data may be destined to the same destination. To manage the flow of data, each destination output has associated with it a queue and some form of control means which functions to manage to flow of data from each of the data sources into the queue. The control means that is utilized in many devices is called an arbiter. It is preferable that the arbiter decide the order in which the data sources load data into the destination queue in a manner that is fair. The decision as to which source should transmit data to the destination queue should preferably also be made as quick as possible in light of (1) the potentially large number of sources vying for the same destination queue and (2) the high data rate of the traffic being carried over the network.

A block diagram illustrating the data flow between multiple sources of data and a destination queue whereby the flow of data to the queue is controlled by an arbiter is shown in FIG. 1. The arbiter portion, generally referenced 10, of the network device comprises a plurality of input data sources labeled input source #1 through input source #N, a plurality of source queues 12 labeled source queue #1 through source queue #N, an arbiter 14, backpressure information source 16 and a destination queue 18.

Each input source transmits data to its corresponding source queue. Each source queue sends both data 20 and an empty flag 22 indicating that the particular source queue is empty. The arbiter receives the data and empty flags from all the source queues and outputs data to the destination queue in accordance with its arbitration scheme. The destination queue transmits data to one or more output ports. The backpressure information source 16 provides backpressure information from downstream processing elements, such as the switching fabric or output ports, to the arbiter.

The explosive growth in networks and the pressing drive for faster data rates is resulting in a larger number of data sources vying to send data to any one destination port. Thus, designers of network equipment are searching for solutions that enable the management of source queues in an intelligent manner such that selection decisions are made at high speed and in a manner fair to the plurality of input data sources. Previous to the recent growth in network use with the high demand for higher speeds and larger bandwidths, the management of input source queues did not create a bottleneck in the flow of network traffic. Thus, a relatively simple and straightforward technique was used.

A description of a prior art implementation of a fair arbitration scheme among several input data sources will now be presented. Diagrams illustrating a prior art source index queue used to determine the order of access to a destination queue by multiple data sources is shown in FIGS. 2A, 2B and 2C. In this type of prior art arbiter implementation, a source index queue 30 is created which includes a plurality of index numbers 32 with each index number corresponding to an input source queue. In addition, the queue includes an indication 34 of the status of each input source queue.

When the arbiter wants to retrieve data from one of the input queues, it cycles through the entries in the source index queue 30, beginning from the top of the queue, searching for the first input source entry that has data, i.e., a packet, available for transmission to the output destination queue. An input source queue that has data ready to transmit has its data ready indication 34 set to a '1'. Once a source is selected, its corresponding index number is placed at the end of the source index queue 30 and the other index numbers above it are pushed up one position.

With reference to FIGS. 2A and 2B, it is assumed that there are N sources and one destination. Initially, the order of the contents of the index queue corresponds to the order of the N input source queues, i.e., source #1, #2 . . . #N. An additional bit 34 indicates whether the source has a packet available to transmit to the destination. Note that this bit can be set to '0', i.e., unavailable, due to an empty source queue or due to backpressure from the destination, indicating that this particular source queue is not permitted to send packets.

Now assume, for example, that source #5 is the first source in the index queue with its data ready indication set to a '1'. The arbiter searches for the first input source that has a packet of data available for transmission to the destination. In this example source #5 is selected as the source queue to transmit data. Following transmission of the data, the source index #5 is placed at the end of the index queue 30 as represented by arrow 36. Indexes numbered 6 through N are moved up one position.

FIG. 2B shows the state of the index queue after source #5 was read and placed on the bottom of the queue, i.e., given lowest priority. During the next cycle source #3 is the first input source queue with data available to transmit. Note that in FIG. 2A, source #3 had no data available for transmission. This is due to the fact that the available data bit indicators are dynamically updated in response to the input and output ports as described previously and thus they change from cycle to cycle of the arbiter. The data is read from input source queue #3 and then its index is placed at the bottom of the index queue as represented by arrow 40 and shown in FIG. 2C.

Therefore, this prior art arbitration implementation utilizes a least recently used mechanism whereby the queue with data available to send and that has not sent data the longest is the next one to transmit. Note, however, that a growing number of input sources and the increasing data rates of networks create demand for high speed intelligent arbitration solutions. A disadvantage of using the prior art arbitration scheme described above for high speed networks is that the searching process is inefficient in that sources that have no data available to transmit must be checked. In addition, in the worst case, the search process must examine every source queue in the source index queue, thus requiring the examination of N sources. This occurs when only the Nth source queue in the source index queue has data available for transmission.

Another disadvantage is that when shifting the sources up in the index queue, the worst case scenario occurs when all the entries except the first must be shifted up one position. This occurs when the source queue chosen by the arbiter to transmit is the first source queue at the top of the queue. After transmitting, the source index must be placed at the bottom of the index queue, requiring the entire index queue to be shifted up one position. This requires significant amounts of time to be spent on shifting the contents of the source index queue. In addition, additional circuitry, i.e., silicon, is also required to perform the shifting function. As the number of source queues grow, the size of the index queue increases, thus requiring additional time and silicon resources.

SUMMARY OF THE INVENTION

The present invention is an arbiter that utilizes a link list to arbitrate access between multiple data sources and a single destination queue. The arbiter is of the least recently used type whereby the data source that has not sent data for the longest time is given the highest priority. This arbitration scheme is a fair method of distributing access to the destination queue among all the data sources.

The arbiter is suitable for applications wherein many input channels want to send data to a single output channel. During each cycle, the arbiter chooses one input channel for data transmission to the output. The LRU mechanism is used to make the arbitration process fair to all input channels. The arbiter of the present invention reduces the arbiter cycle time to a minimum by having the arbiter search only those input channels that have data available to transmit during that cycle.

The arbiter of the present invention provides an arbitration function in a simpler manner and at higher speed than the prior art. The arbiter can be easily implemented in various networking products that handle large numbers of input sources (queues, ports, etc.).

The arbiter creates a linked list of all the input queues that have data available for transmission, i.e., at least one packet of data. Every input queue that was previously empty and now has data to send, is added to the linked list. In addition, every input queue that no longer has any data available for transmission is deleted from the linked list.

The present invention utilizes a linked list method whereby a list is created termed a Non Empty Source Queue (NESQ) list that comprises only sources that are non empty, i.e., that have data ready to send. Using the NESQ list, the average search time to find the next source ready to transmit is now dramatically reduced. The search time is determined by the number of input sources that have data available to send at the time the search is performed.

In addition, after a source queue is chosen for data transmission, the contents of the linked list are reordered to implement the least recently used scheme by updating two pointers. No shifting of any of the sources on the list is required as was the case with the prior art arbiter scheme. When a source queue becomes empty after the transmission of data, the source index is removed from the linked list. Conversely, when a source queue that was previously empty, i.e., is not on the linked list, receives a new packet, it will be added to the end of the linked list.

The arbiter of the present invention performs two main methods in implementing the arbitration function: (1) adding a new input source queue to the liked list and (2) searching for a source queue with data ready to transmit and subsequently removing them from the linked list.

There is provided in accordance with the present invention an arbiter for managing data flow between a plurality of input sources and an output destination comprising a non empty source queue (NESQ) having a plurality of entries, each entry corresponding to one input source and comprising a data pointer, a linked list containing an ordered list of pointers to input sources, the ordered list having a head and a tail pointed to by a head pointer and a tail pointer, respectively, the ordered list representing the order the plurality of input sources are permitted to send data to the output destination, wherein input sources are selected from the head of the linked list, once a selected source transmits data, it is placed at the tail of the linked list if it has additional data to transmit and is removed from the linked list otherwise and wherein an input source not previously on the linked list is added thereto when the input source has data available for transmission.

The NESQ list comprises a block of memory and a backpressure indication associated with each input source wherein an input source is not permitted to transmit data to the output destination if its associated backpressure indication is positive.

An input source is added to the NESQ list by writing the source index of the input source to be added to the entry in the NESQ list pointed to by the tail pointer followed by setting the tail pointer to the input source to be added. Input sources are selected from the NESQ list by scanning beginning with the entry pointed to be the head pointer and continuing with the entry pointed to by the data pointer associated therewith.

There is also provided in accordance with the present invention an arbiter for managing data flow between a plurality of input sources and an output destination comprising a non empty source queue (NESQ) having a plurality of entries, each entry corresponding to one input source and comprising a data pointer, a linked list containing an ordered list of pointers to input sources, the ordered list having a head and a tail pointed to by a head pointer and a tail pointer, respectively, the ordered list representing the order the plurality of input sources are permitted to send data to the output destination, means for adding an input source to the NESQ list when the input source has data available for transmission, means for selecting an input source from among those input sources ready to transmit data, means for transmitting data from the selected input source and subsequently removing the selected input source from the linked list and means for placing the selected input source at the tail of the linked list if the selected input source has additional data to transmit.

BRIEF DESCRIPTION OF THE DRAWINGS

The invention is herein described, by way of example only, with reference to the accompanying drawings, wherein:

FIG. 4 is a flow diagram illustrating the method of the present invention of searching for and removing the next data source ready to transmit data;

FIG. 6A is a diagram illustrating a second example source index queue constructed in accordance with the present invention;

FIG. 6B is a diagram illustrating the contents of the linked list of the second example source index queue of FIG. 6A;

DETAILED DESCRIPTION OF THE INVENTION

Notation Used Throughout

The following notation is used throughout this document.

| Term | Definition |
| --- | --- |
| ANSI | American National Standards Institute |
| ATM | Asynchronous Transfer Mode |
| CCITT | Comite Consultatif International Telegraphique et Telephonique |
| FDDI | Fiber Distributed Data Interface |
| IP | Internet Protocol |
| ITU | International Telecommunications Union |
| LRU | Least Recently Used |
| NESQ | Non Empty Source Queue |
| TCP | Transmission Control Protocol |
| UNI | User to Network Interface |

General Description

The present invention is an arbiter that utilizes a linked list to manage a memory index list of all the input sources numbered #1 through #N. The memory index list is termed a Non Empty Source Queue (NESQ) list. The NESQ list contains an entry for each input source. The entry consists of two fields: (1) a backpressure indication for that input source and a pointer which is used to point to the next source queue with data available to send. The pointer entries for source queues without data available to send are set to null.

The linked list comprises a list of pointers to the source queues with data ready to transmit. A head pointer and a tail pointer keep track of who is first in the list and who is last in the list, respectively. The average search time to find the next source ready to transmit is dramatically reduced by use of the linked list. The search time being determined by the number of input sources that have data available to send at the time of the search.

After a source queue is chosen for data transmission, the contents of the linked list are reordered to carry out the least recently used scheme by updating two pointers: a head pointer and a tail pointer. No shifting of any of the sources on the list is required. When a source queue becomes empty after the transmission of data, the source index is removed from the linked list and when a source queue that was previously empty receives a new packet, it is added to the end of the linked list. Each entry in the linked list includes a source index representing one of the input sources, i.e., 1 through N, and a bit or other indication of the backpressure information for that source queue.

The arbiter of the present invention performs two main methods in implementing the arbitration function: (1) adding a new input source queue to the linked list and (2) searching for a source queue with data ready to transmit and subsequently removing the queue from the linked list.

Figure 1:
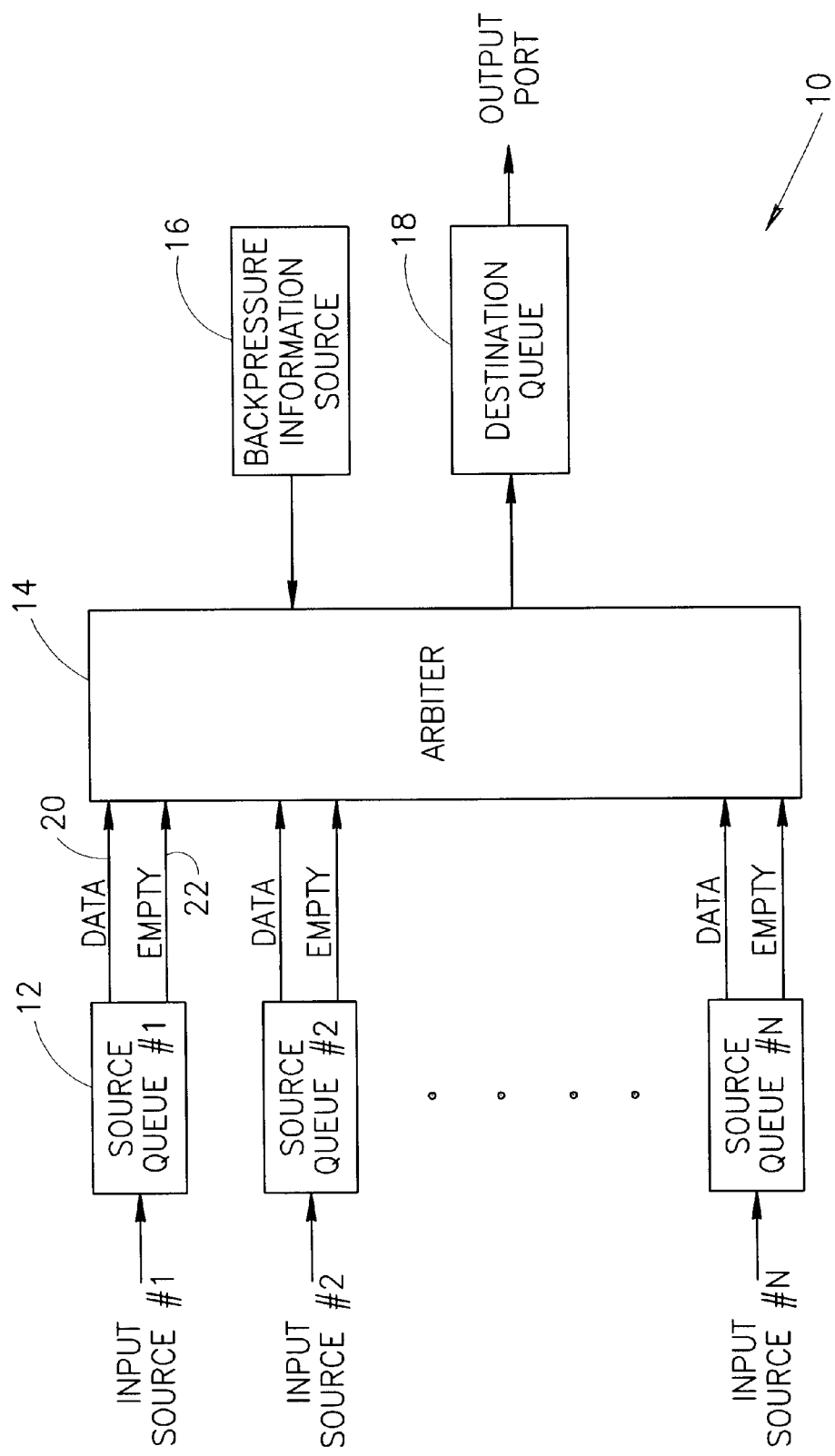
FIG. 1 is a block diagram illustrating the data flow between multiple sources of data and a destination queue whereby the flow of data to the queue is controlled by an arbiter.
Figure 2:
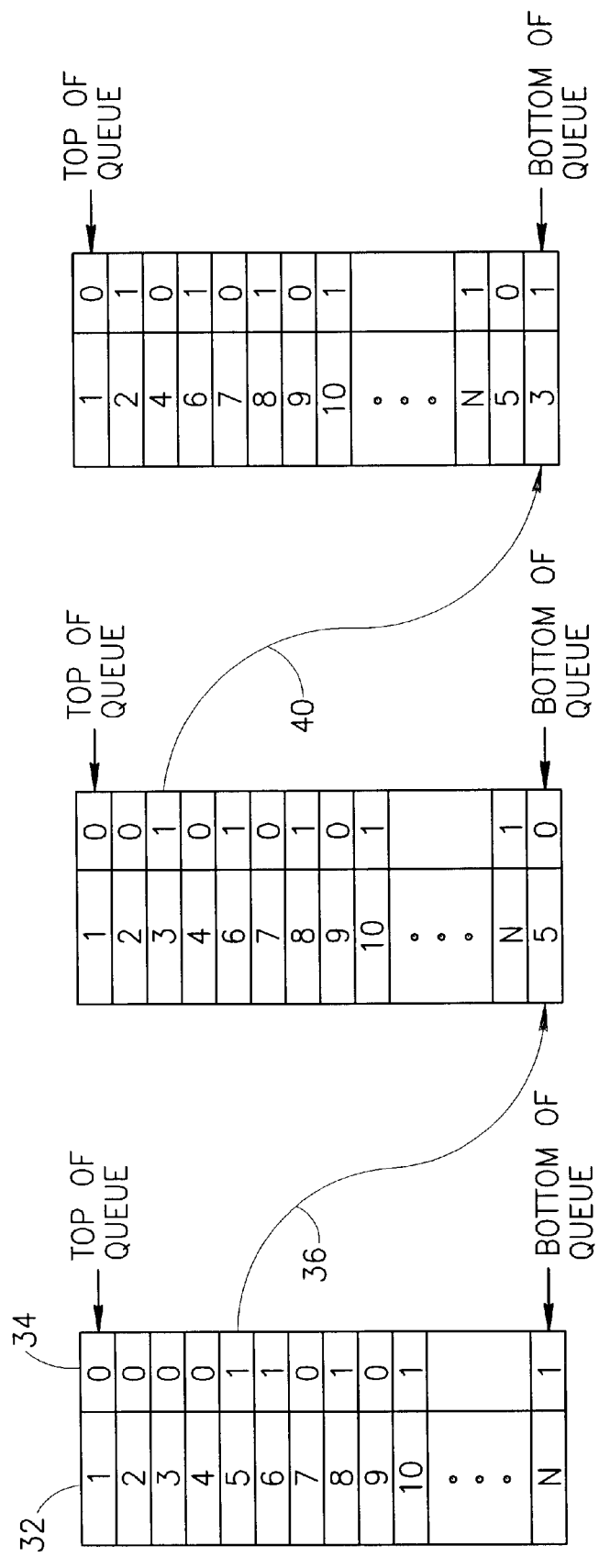
FIGS. 2A, 2B and 2C are diagrams illustrating a prior art source index queue used to determine the order of access to a destination queue by multiple data sources.
Figure 3:
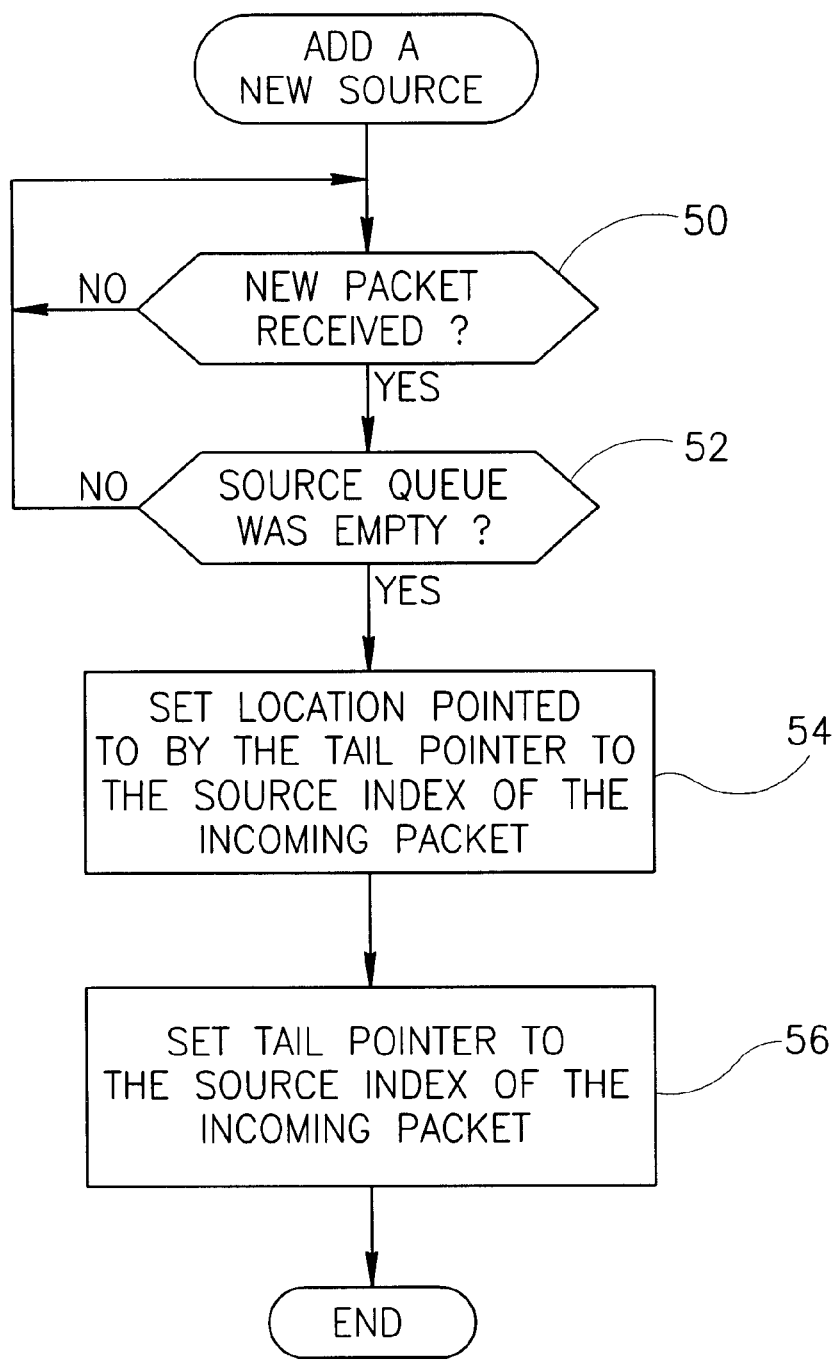
FIG. 3 is a flow diagram illustrating the method of the present invention of adding a new data source to the source index queue.

A flow diagram illustrating the method of the present invention of adding a new data source to the source index queue is shown in FIG. 3. With reference also to FIG. 1, the input source queues receive data from their respective ports. Each source queue has means by which it indicates whether the queue is empty or not by use of an empty flag 22. The empty flag indicators from each source queue are input to the arbiter 14 which scans for transitions from empty to non empty (step 50). When a source queue receives data and the source queue was previously empty (step 52) then it is placed at the end of the linked list (step 54). It is skipped over otherwise. The location in the NESQ list currently pointed to by the tail pointer is set to the source index of the source queue receiving the incoming data. The tail pointer is then set to the source index of the incoming queue receiving the incoming data (step 56). If the linked list was previously empty, the head pointer is also set to the source index of the incoming queue receiving the incoming data.

A flow diagram illustrating the method of the present invention of searching for and removing the next data source ready to transmit data is shown in FIG. 4. The arbiter selects the first source queue in the NESQ list as pointed to by the head pointer (step 60). It is then checked whether the source queue is permitted to transmit data, i.e., whether it is backpressured or not, by examining the backpressure bit (step 62). If it cannot send data, the next source queue in the NESQ list is examined (step 64). The order of scanning the NESQ list is determined by the linked list. The next source queue is found by using the next pointer field for the current source in the NESQ list.

Once a source queue is found that is permitted to transmit data, the arbiter reads the data from the source queue and transmits it to the destination (step 66). The source queue is then removed from the list (step 68). This is performed by removing the link in the linked list corresponding to that particular source queue. The source index to the next source queue is written to the memory location corresponding to the previous source queue in the linked list.

The arbiter then checks whether the source queue is empty, i.e., whether it has additional data to send (step 70). If it has additional data, the source queue is placed at the end of the NESQ list (step 72). The source index of the source queue currently being read is written to the location pointed to by the tail pointer. The tail pointer is then set to the source index of the source queue index currently being read (step 74).

Figure 5B:
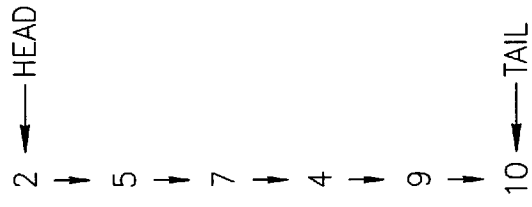
FIG. 5B is a diagram illustrating the contents of the linked list of the first example source index queue of FIG. 5A.
Figure 5A:
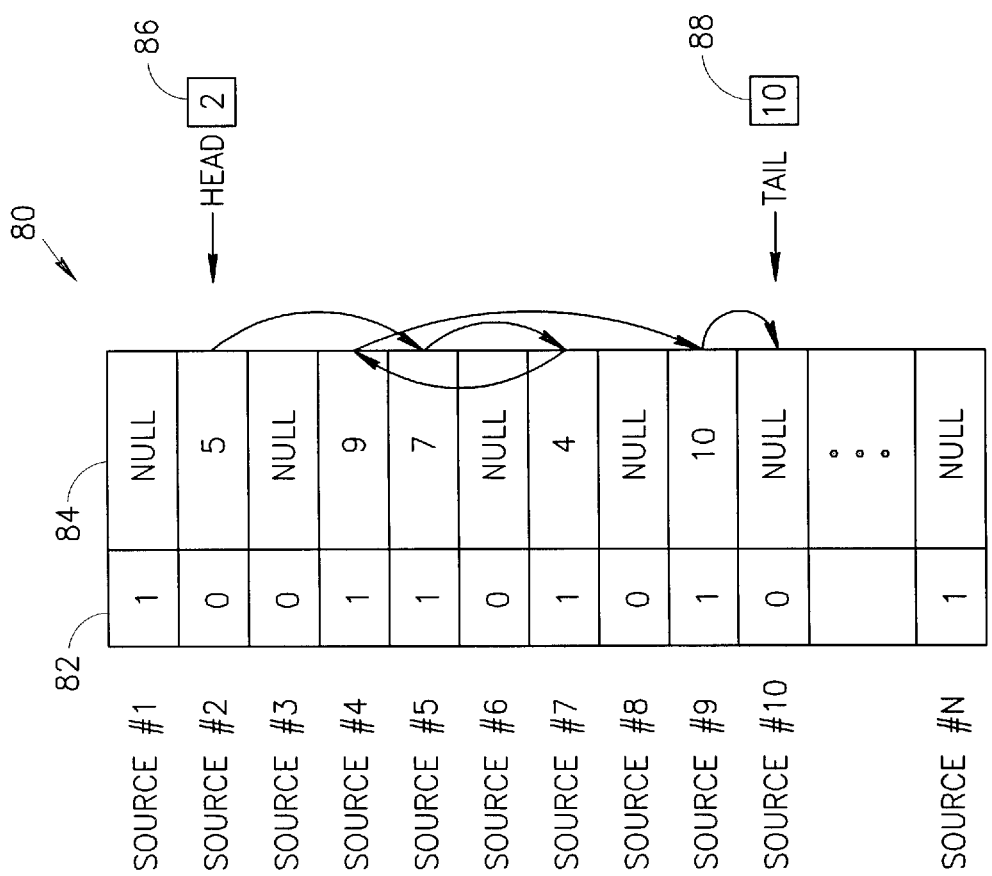
FIG. 5A is a diagram illustrating a first example source index queue constructed in accordance with the present invention.

A diagram illustrating an example source index queue constructed in accordance with the present invention is shown in FIG. 5A. Assume there are N input sources and a block of memory defined having N entries. Each entry corresponding to one of the input source queues in a fixed order. The memory block contains the NESQ list, generally referenced 80, which comprises N entries corresponding to input source queues #1 through #N. Each entry comprises a backpressure indication bit 82 and a data pointer 84 that points to the next source index on the NESQ list. A head pointer 86 points to the head of the linked list and a tail pointer 88 points to the end of the linked list. Initially, both pointers point to null until the first source queue is entered in the NESQ list. The length of the NESQ list is the number of sources that have data ready to transmit. The example shown in FIG. 5A already has six sources on the NESQ list ready to transmit data. The corresponding linked list showing the order of the source indexes is shown in FIG. 5B.

The search process performed by the arbiter is based on the linked list and starts with the source index pointed to by the head pointer. If the first source on the NESQ list is not backpressured, it is chosen for data transmission. If it is, then the next source in accordance with the linked list is checked. For example, source #2 is at the head of the NESQ list, since it is backpressured, the next source pointed to by the data pointer of the current source is checked, i.e., source #5. Since source #5 is not backpressured, it is chosen to send data.

Assuming source #5 is not empty after transmission and has additional data to send, it is moved to the end of the linked list as shown in FIGS. 6A and 6B. The data pointer for source #2 is set to point to source #7, the data pointer for source #10 is set to point to source #5 and the tail pointer is set to source #5. If source queue #5 became empty after being read, it would have been deleted from the NESQ list and the linked list and not placed at the end.

Figure 7B:
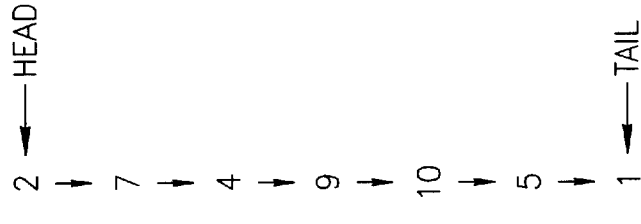
FIG. 7B is a diagram illustrating the contents of the linked list of the third example source index queue of FIG. 7A.
Figure 7A:
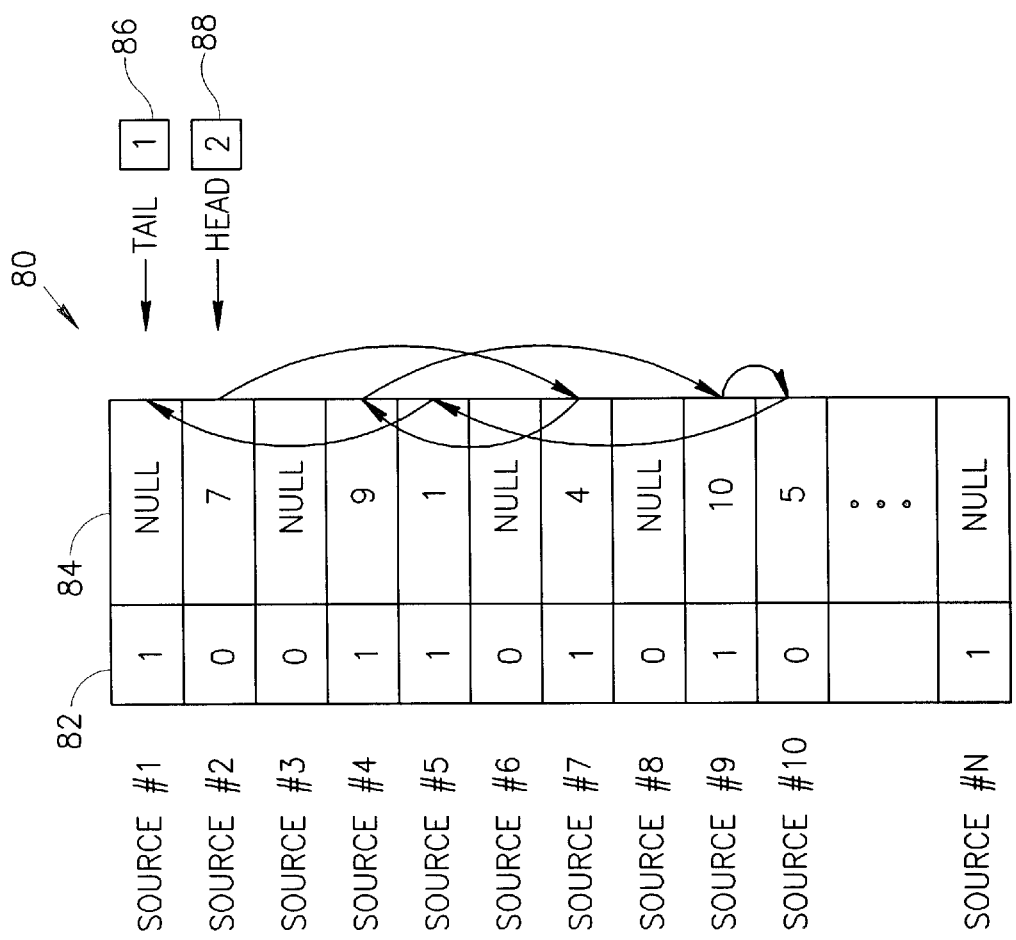
FIG. 7A is a diagram illustrating a third example source index queue constructed in accordance with the present invention.

With reference to FIGS. 7A and 7B, assume that until this point, source queue #1 was empty. It now, however, has data to be transmitted. In accordance with the method of FIG. 3, it is added to the end of the NESQ list (assuming that it was not already on the NESQ list). Since source queue #5 is currently at the tail, the data pointer for source #5 is set to point to source #1. The tail pointer is also set to point to source #1 indicating that it is at the end of the linked list.

An advantage of the arbiter of the present invention is that a source queue can be added to the NESQ list using only two operations regardless of the number of source queues on the NESQ list. Regardless of the length of the NESQ list only the data pointer of the tail entry and the tail pointer itself need be modified. In addition, source queues without data available for transmission are not examined in the scanning process thus reducing scan time considerably. In addition, moving a source queue to the end of the NESQ list to implement the least recently used scheme comprises two operations regardless of the number of entries on the NESQ list. This also saves considerable time and greatly speeds up the arbitration process.

While the invention has been described with respect to a limited number of embodiments, it will be appreciated that many variations, modifications and other applications of the invention may be made.

What is claimed is:

1. An arbiter for managing data flow between a plurality of input sources and an output destination, comprising:

a non empty source queue (NESQ) list having a plurality of entries, each entry corresponding to one input source and comprising a data pointer;

a linked list containing an ordered list of pointers to input sources, said ordered list having a head and a tail pointed to by a head pointer and a tail pointer, respectively, said ordered list representing the order said plurality of input sources are permitted to send data to said output destination;

wherein each input source is associated with a backpressure indication that indicates whether an input source is permitted to transmit data to said output destination;

wherein input sources are selected from the head of said linked list, once a selected source transmits data, it is placed at the tail of said linked list if it has additional data to transmit and is removed from said linked list otherwise; and wherein an input source not previously on said linked list is added thereto when said input source has data available for transmission.

2. The arbiter according to claim 1, wherein said NESQ list comprises a block of memory.

3. The arbiter according to claim 1, wherein said NESQ list comprises a backpressure indication associated with each input source wherein an input source is not permitted to transmit data to said output destination if its associated backpressure indication is positive.

4. The arbiter according to claim 1, wherein an input source is added to said NESQ list by writing the source index of said input source to be added to the entry in said NESQ list pointed to by said tail pointer followed by setting said tail pointer to said input source to be added.

5. The arbiter according to claim 1, wherein input sources are selected from said NESQ list by scanning beginning with the entry pointed to be said head pointer and continuing with the entry pointed to by the data pointer associated therewith.

6. An arbiter for managing data flow between a plurality of input sources and an output destination, comprising:

a non empty source queue (NESQ) list having a plurality of entries, each entry corresponding to one input source and comprising a data pointer;

a linked list containing an ordered list of pointers to input sources, said order list having a head and a tail pointed to by a head pointer and a tail pointer, respectively, said ordered list representing the order said plurality of input sources are permitted to send data to said output destination, wherein a backpressure indication associated with each input source indicates whether an input source is permitted to transmit data to said output destination;

means for adding an input source to said NESQ list when the input source has data available for transmission;

means for selecting an input source from among those input sources ready to transmit data;

means for transmitting data from the selected input source and subsequently removing said selected input source from said linked list; and means for placing said selected input source at the tail of said linked list if the selected input source has additional data to transmit.

7. The arbiter according to claim 6, wherein said NESQ list comprises a block of memory.

8. The arbiter according to claim 6, wherein said NESQ list comprises a backpressure indication associated with each input source wherein an input source is not permitted to transmit data to said output destination if its associated backpressure indication is positive.

9. The arbiter according to claim 6, wherein said input source is added to said NESQ list by writing the source index of said input source to be added to the entry in said NESQ list pointed to by said tail pointer followed by setting said tail pointer to said input source to be added.

10. The arbiter according to claim 6, wherein said input source is selected from said NESQ list by scanning beginning with the entry pointed to be said head pointer and continuing with the entry pointed to by the data pointer associated therewith.

* * * * *